(12) United States Patent
Song

(10) Patent No.: US 11,879,609 B2
(45) Date of Patent: Jan. 23, 2024

(54) LAMP FOR VEHICLE, VEHICLE, AND METHOD FOR MANUFACTURING LAMP FOR VEHICLE

(71) Applicant: HYUNDAI MOBIS CO., LTD., Seoul (KR)

(72) Inventor: Ki Ryong Song, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/718,544

(22) Filed: Apr. 12, 2022

(65) Prior Publication Data
US 2022/0341558 A1    Oct. 27, 2022

(30) Foreign Application Priority Data
Apr. 21, 2021 (KR) .................. 10-2021-0051905

(51) Int. Cl.
*F21S 41/29* (2018.01)
*F21S 41/24* (2018.01)
*F21V 8/00* (2006.01)

(52) U.S. Cl.
CPC .............. *F21S 41/24* (2018.01); *F21S 41/29* (2018.01); *G02B 6/001* (2013.01)

(58) Field of Classification Search
CPC ........ F21S 41/24; F21S 43/237; F21S 43/245; F21S 43/235; F21S 41/29; F21S 43/27; F21S 41/192; F21S 43/195; G02B 6/001; G02B 6/0006; G02B 6/0005; G02B 6/0008; F21V 2200/10
See application file for complete search history.

(56) References Cited

U.S. PATENT DOCUMENTS

| 5,276,594 A * | 1/1994 | Burkett ............... B60Q 1/0011 |
| | | 362/540 |
| 2002/0003706 A1* | 1/2002 | Dealey, Jr. .......... G02B 6/0005 |
| | | 362/478 |
| 2018/0299092 A1* | 10/2018 | Orisich ................. G02B 6/001 |

FOREIGN PATENT DOCUMENTS

DE       202012012607 U1 *   9/2013   ............ F21S 48/211

OTHER PUBLICATIONS

Search English translation of DE-202012012607-U1 (Year: 2013).*

* cited by examiner

Primary Examiner — Omar Rojas Cadima
(74) Attorney, Agent, or Firm — NovoTechIP International PLLC

(57) ABSTRACT

The lamp for a vehicle includes a lamp housing, a light source part housed at the lamp housing and that irradiates light, a bezel installed in the lamp housing, an optical fiber, one end of which is fixed to one side of the bezel and an opposite end of which is assembled on an opposite side of the bezel, connected to the light source part, and that outputs light irradiated from the light source part, and an fixing unit, in which the opposite end of the optical fiber is assembled on the opposite side of the bezel, and the fixing unit includes a bracket fixed to the bezel, and an fixing member, to which the opposite end of the optical fiber is fixed, and assembled in the bracket.

19 Claims, 13 Drawing Sheets

LAMP FOR VEHICLE, VEHICLE, AND METHOD FOR MANUFACTURING LAMP FOR VEHICLE

CROSS-REFERENCE TO RELATED APPLICATIONS

This application claims the benefit of priority to Korean Patent Application No. 10-2021-0051905, filed in the Korean Intellectual Property Office on Apr. 21, 2021, the entire contents of which are incorporated herein by reference.

BACKGROUND

1. Technical Field

The present disclosure relates to a lamp for a vehicle, a vehicle, and a method for manufacturing a lamp for a vehicle, and more particularly, to a lamp for a vehicle, by which an optical fiber installed in an interior of the lamp may be stably fixed, a vehicle, and a method for manufacturing a lamp for a vehicle.

2. Discussion of Related Art

In general, a vehicle is equipped with various kinds of lamps having a lighting function for allowing a user to easily identify an object located around a vehicle during nighttime driving and a signal function for informing other vehicles or road users of a driving state of the vehicle. In recent years, an importance of lamps in an aspect of design as well as an aspect of functions of the lamps has increased, and lamps that enhance a degree of freedom of design have been developed by using optical fibers.

The optical fibers for lighting may be classified into an end emitting optical fiber that emits light from an end thereof, and a side emitting optical fiber that emits light from a side thereof. The end emitting optical fiber may be easily fixed because only an end cross-section thereof is exposed and an intermediate portion thereof is not exposed, and it is difficult to fix the side emitting optical fiber with a general fixing structure that fixes the end emitting optical fiber because it emits light from a side surface thereof as well as opposite ends thereof and thus most of the areas of the optical fiber are exposed.

When the side emitting optical fiber is fixed with a conventional fixing structure of the end emitting optical fiber, the optical fiber may be prolonged or separated when the vehicle is assembled or vibrates due to properties of the optical fiber, and thus a product value of the lamp for a vehicle may deteriorate. Accordingly, it is necessary to improve a structure, in which the side emitting optical fiber may be stably installed when it is applied to the vehicle.

SUMMARY

The present disclosure has been made to solve the above-mentioned problems occurring in the prior art while advantages achieved by the prior art are maintained intact.

An aspect of the present disclosure provides a lamp for a vehicle, in which a side emitting optical fiber may be fixed while being tensioned by using a fixing unit when the optical fiber is installed, a vehicle, and a vehicle including a lamp for a vehicle.

Another aspect of the present disclosure provides a lamp for a vehicle that enhances a product value by minimizing prolongation of an optical fiber due to assembling or vibration of a vehicle even when the optical fiber is a side emitting optical fiber, a vehicle, and a vehicle including a lamp for a vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a lamp housing, a light source part mounted on the lamp housing and that irradiates light, a bezel installed in the lamp housing, an optical fiber, one end of which is fixed to one side of the bezel and an opposite end of which is assembled on an opposite side of the bezel, connected to the light source part, and that outputs light irradiated from the light source part, and an fixing unit, in which the opposite end of the optical fiber is assembled on the opposite side of the bezel, and the fixing unit includes a bracket fixed to the bezel, and an fixing member, to which the opposite end of the optical fiber is fixed, and assembled in the bracket.

According to another aspect of the present disclosure, a vehicle includes a lamp, the lamp includes a lamp housing, a light source part mounted on the lamp housing and that irradiates light, a bezel installed in the lamp housing, an optical fiber, one end of which is fixed to one side of the bezel and an opposite end of which is assembled on an opposite side of the bezel, connected to the light source part, and that outputs light irradiated from the light source part, and an fixing unit, in which the opposite end of the optical fiber is assembled on the opposite side of the bezel, and the fixing unit includes a bracket fixed to the bezel, and an fixing member, to which the opposite end of the optical fiber is fixed, and coupled to the bracket.

According to another aspect of the present disclosure, a method for manufacturing a lamp for a vehicle includes (1) preparing an optical fiber, of which a first end is fixed to an fixing member, (2) fixing a second end of the optical fiber to one side of the bezel, and causing the first end of the optical fiber to pass through an opposite side of the bezel, (3) applying a tension to the optical fiber by rotating the fixing member such that the optical fiber is wound, and (4) coupling the fixing member to a bracket fixed to the bezel in a state, in which the tension is applied to the optical fiber in (3).

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described herein are embodiments that are suitable for understanding the technical features of a lamp for a vehicle, a vehicle, and a method for manufacturing a lamp for a vehicle according to the present disclosure. However, the present disclosure is not limited to the embodiment described below or the technical features of the present disclosure are not limited by the described embodiments, and the present disclosure may be variously modified without departing from the technical scope of the present disclosure.

Figure 1:
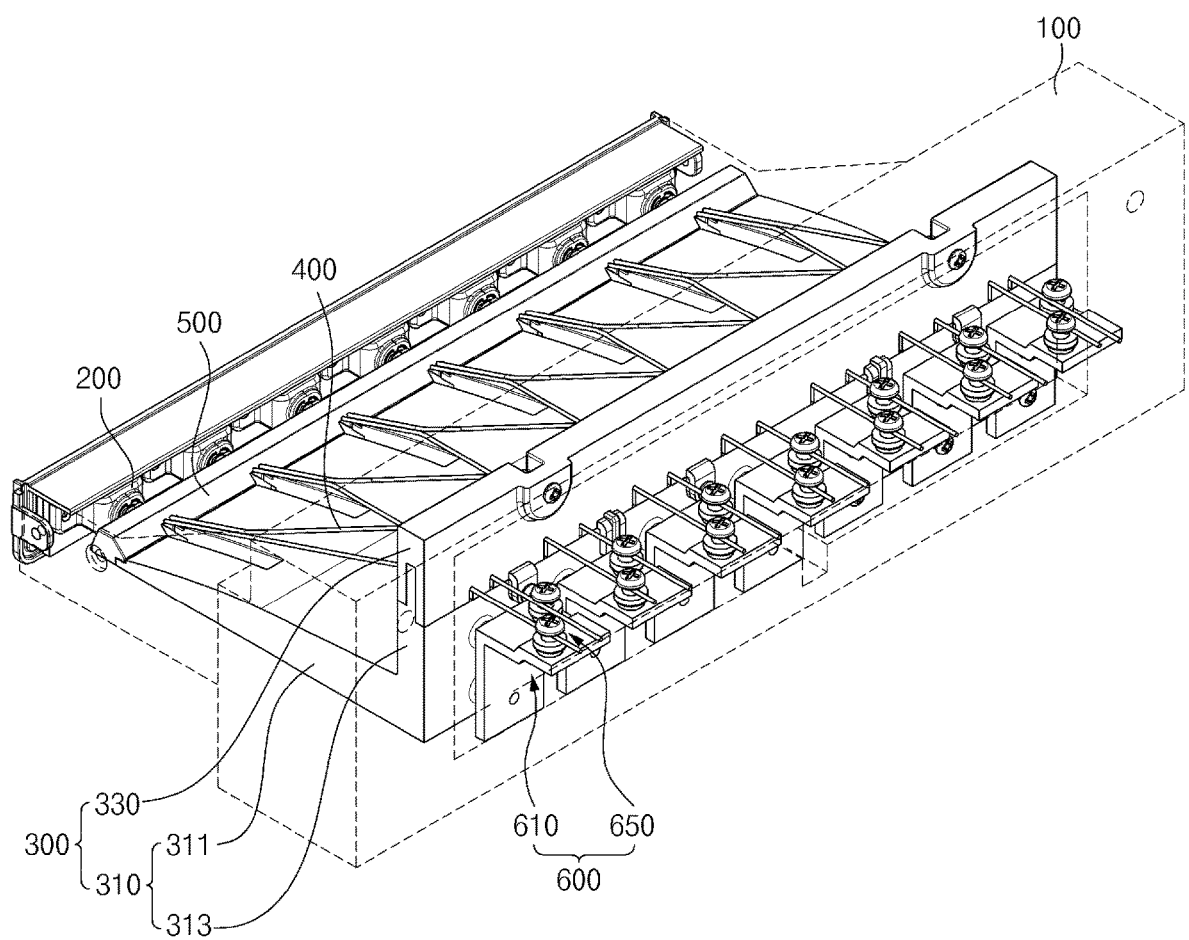
FIG. 1 is a perspective view illustrating a lamp for a vehicle according to a first embodiment of the present disclosure.
Figure 2:
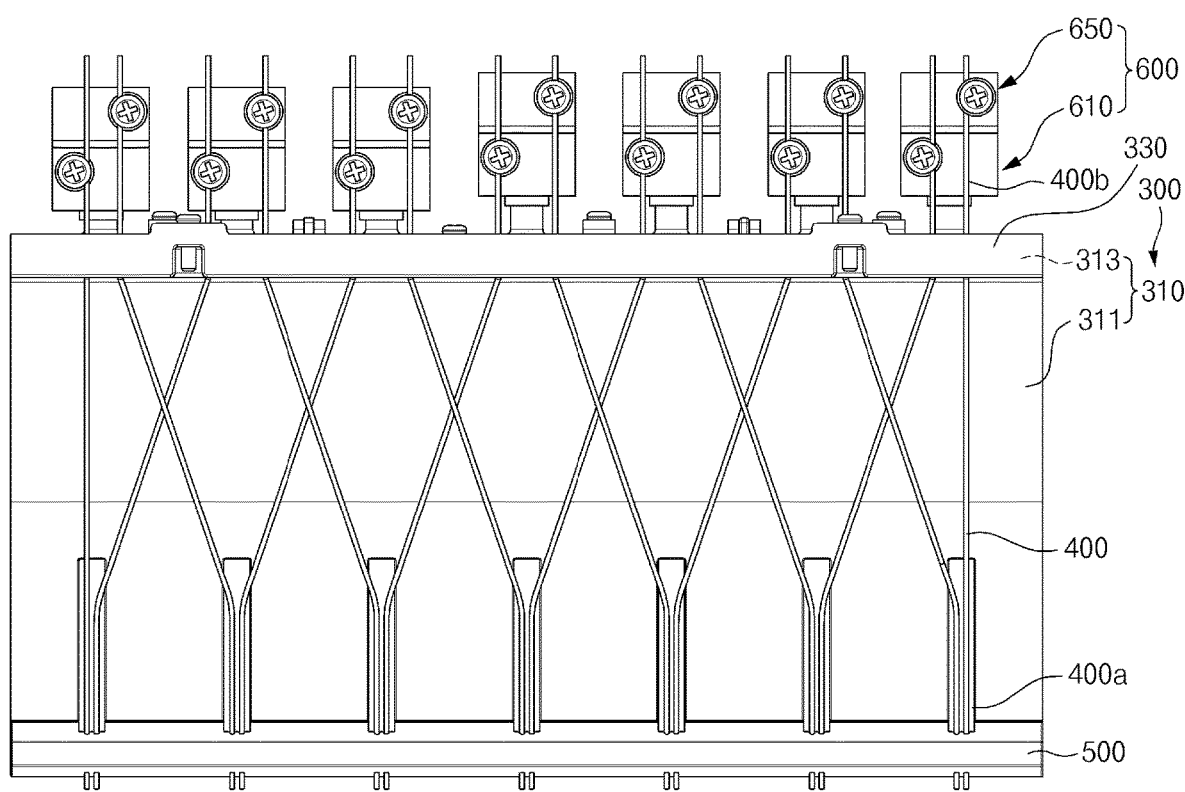
FIG. 2 is a top view illustrating a lamp for a vehicle according to a first embodiment of the present disclosure, and is a view illustrating a state, in which a lamp housing of FIG. 1 is removed.
Figure 3:
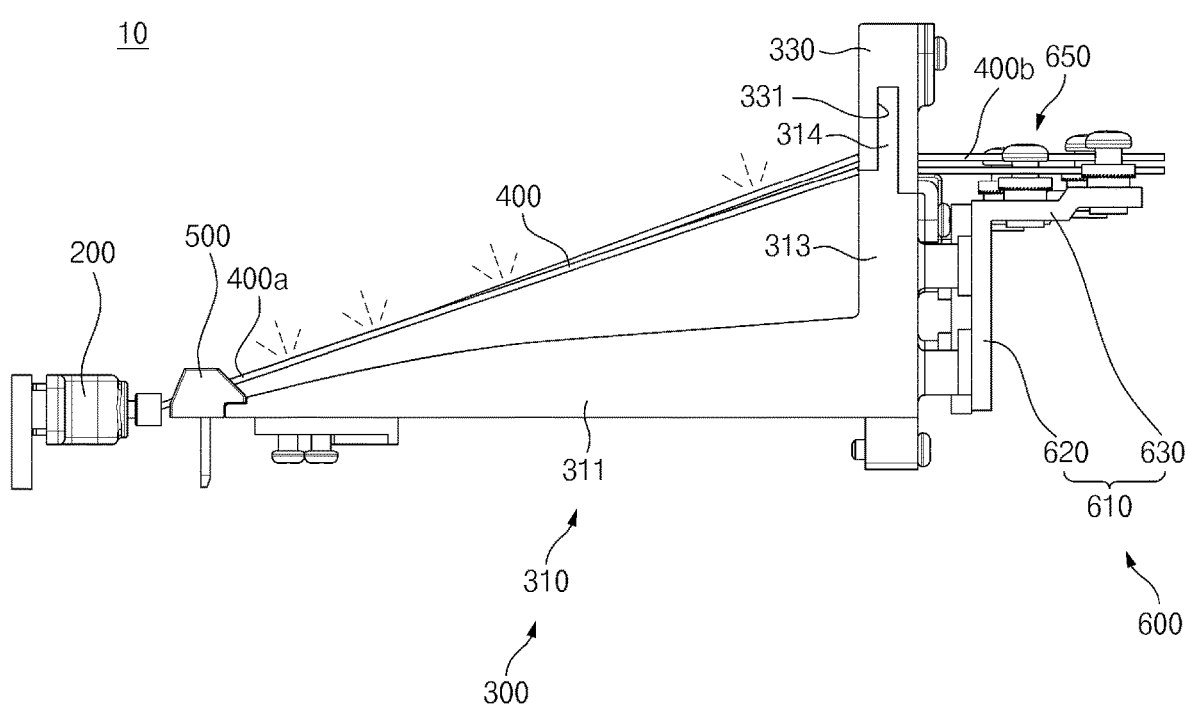
FIG. 3 is a front view illustrating a lamp for a vehicle according to a first embodiment of the present disclosure, and is a view of FIG. 2, when viewed from a right side.
Figure 4:
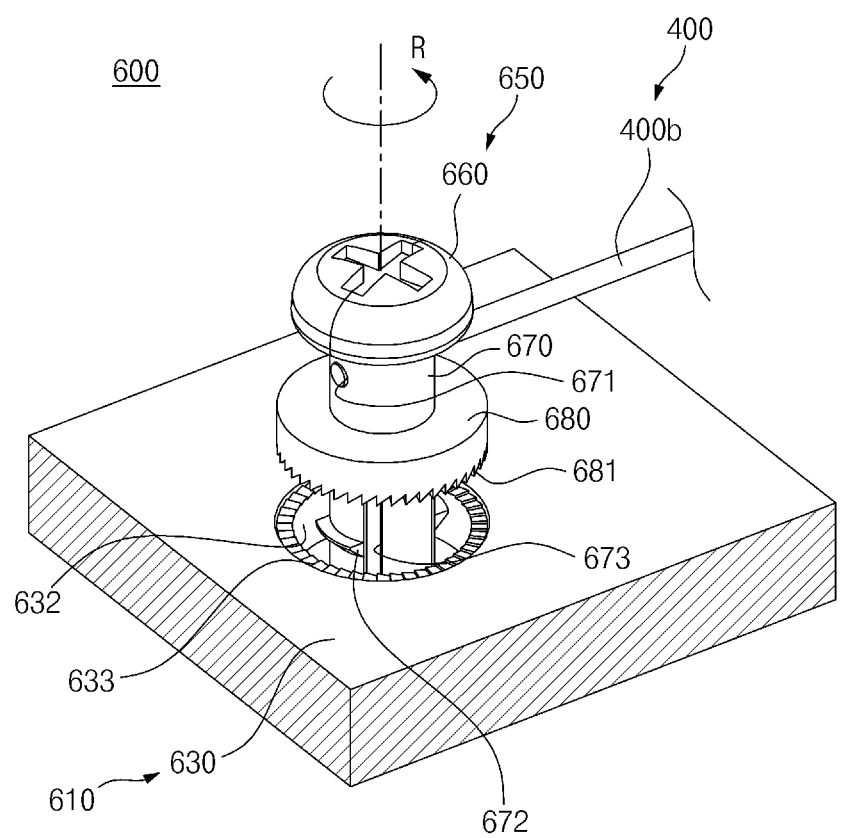
FIG. 4 is a perspective view illustrating a fixing unit according to a first embodiment of the present disclosure.
Figure 5:
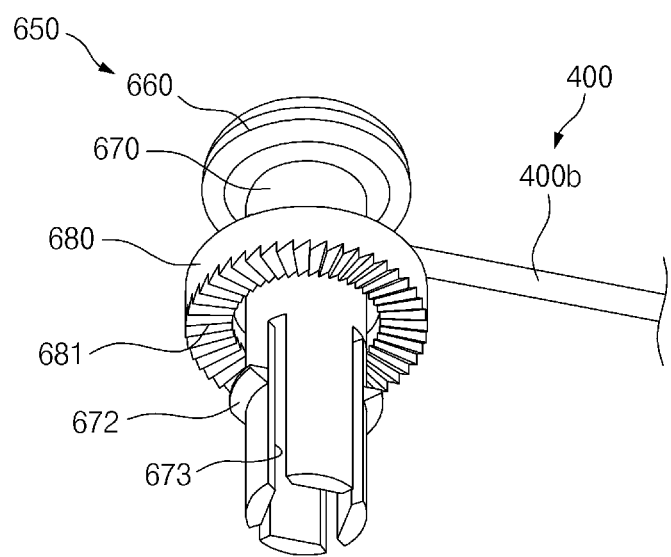
FIG. 5 illustrates a fixing unit according to a first embodiment of the present disclosure, and is a perspective view illustrating a fixing member of FIG. 4.

FIG. 1 is a perspective view illustrating a lamp for a vehicle according to a first embodiment of the present disclosure. FIG. 2 is a top view illustrating the lamp for a vehicle according to the first embodiment of the present disclosure, and is a view illustrating a state, in which a lamp housing of FIG. 1 is removed. FIG. 3 is a front view illustrating the lamp for a vehicle according to the first embodiment of the present disclosure, and is a view of FIG. 2, when viewed from a right side. FIG. 4 is a perspective view illustrating a fixing unit according to the first embodiment of the present disclosure. FIG. 5 illustrates the fixing unit according to the first embodiment of the present disclosure, and is a perspective view illustrating a fixing member of FIG. 4.

Referring to FIGS. 1 to 5, a lamp 10 for a vehicle according to a first embodiment of the present disclosure includes a lamp housing 100, a light source part 200, a bezel 300, an optical fiber 400, and a fixing unit 600.

The lamp housing 100 constitutes a body of the lamp 10 for a vehicle, and an accommodation space that accommodates components of the lamp may be formed therein.

The light source part 200 may be housed at or mounted on the lamp housing 100 and may be configured to irradiate light. For example, the light source part 200 may include a board coupled to the lamp housing 100, and a light source mounted on the board. Here, the light source, for example, may be a light emitting diode or a laser, and the board may be a printed circuit board (PCB). One or a plurality of light source parts 200 may be provided in an interior of the lamp housing 100.

The bezel 300 may be coupled to the lamp housing 100. The bezel 300 may be formed to be inserted into the lamp housing 100, and may function to reinforce an overall strength of the lamp. Furthermore, the bezel 300 may be coupled to the interior of the lamp housing 100 to mount and protect the optical fiber 400, and may function to reflect light output from the light source part 200 and the optical fiber 400.

The optical fiber 400 is configured such that one end 400a thereof is coupled or fixed to one side of the bezel 300 and an opposite end 400b thereof is assembled on an opposite side of the bezel 300, is connected to the light source part 200, and output light irradiated from the light source part 200.

Here, the one end 400a of the optical fiber 400 may be connected to the light source part 200 such that the light is input from the light source. Furthermore, at least a portion of the light input from the light source part 200 to the one end 400a of the optical fiber 400 may be output to a side surface of the optical fiber 400.

In detail, the optical fiber 400 may function to provide a path, along which the light output from the light source travels, and output the light. That is, the light input from the light source to the one end 400a of the optical fiber 400 may travel toward the opposite end 400b of the optical fiber 400, and a portion of the light may be output to the side surface of the optical fiber 400 in the process of traveling.

To achieve this, the optical fiber 400 may extend along a direction that is inclined such that it is located on an upper side as it becomes farther away from the light source part 200. FIG. 3 illustrates that the optical fiber 400 may extend along a direction that is inclined to be located on an upper side as it goes to a right side. In this case, the light output from the light source part 200 may be totally reflected on the interior of the optical fiber 400 after being input to the optical fiber 400, a portion of the light may pass through the optical fiber 400, and the light that passes through the optical fiber 400 may be output in a leftward direction of FIG. 3. Meanwhile, a known technology may be applied to the structure of the optical fiber 400.

A plurality of optical fibers 400 may be provided. In the illustrated example, the plurality of (for example, two) optical fibers 400 may be connected to the one light source part 200. The number of the optical fibers 400 connected to the one light source part 200 is not limited to the illustrated embodiment.

Furthermore, the optical fiber 400 may extend from one side to an opposite side of the bezel 300. Furthermore, the one end 400a of the optical fiber 400 may be coupled or fixed to the one side of the bezel 300, and the opposite end 400b of the optical fiber 400 may be coupled or coupled or fixed to the opposite side of the bezel 300. That is, opposite lengthwise ends of the optical fiber 400 may be coupled or fixed to the bezel 300.

However, as described above, because the optical fiber 400 according to the present disclosure is configured such that light is output through the side surface of the optical fiber 400, most of the areas of the optical fibers 400 may be exposed to an outside without being supported by the other configurations, whereby the tension of the optical fiber 400 is not maintained and the optical fiber 400 may prolonged. Accordingly, a product value of the lamp for a vehicle may deteriorate. Accordingly, the present disclosure includes the fixing unit 600 to solve the above problems, and thus may minimize prolongation of the optical fiber 400.

In the fixing unit 600, the opposite end 400b of the optical fiber 400 may be assembled on the opposite side of the bezel 300. Here, the fixing unit 600 includes a bracket 610 and a fixing member 650. The bracket 610 may be coupled or fixed to the bezel 300. The opposite end 400b of the optical fiber 400 may be coupled or fixed to the fixing member 650, and the fixing member 650 may be assembled in the bracket 610.

In detail, a tension may be applied to the optical fiber 400 through a scheme such as rotation when the fixing member 650 is assembled in the bracket 610, and the fixing member 650 may be assembled in the bracket 610 in a state, in which the tension is applied to the optical fiber 400. That is, the optical fiber 400 may be fixed to the bezel 300 in a state, in which the tension is applied thereto. Furthermore, because the fixing member 650 is detachably coupled to the bracket 610 through assembling, when the additional tension is necessary for the optical fiber 400 later, the fixing member 650 may be separated from the bracket 610, and then, it may be assembled again by providing an additional tension to the optical fiber 400.

In this way, the fixing unit 600 according to the embodiment of the present disclosure may has a structure, in which the fixing member 650, to which the optical fiber 400 is fixed, and the bracket 610 fixed to the opposite side of the bezel 300 are assembled with each other, and a tension may be applied to the optical fiber 400 by manipulating the fixing member 650 when the fixing member 650 and the bracket 610 are assembled. Accordingly, by using the lamp 10 for a vehicle according to the present disclosure, in the case of the side light emitting optical fiber 400, prolongation of the optical fiber 400 due to assembling or vibration of the vehicle may be minimized, and accordingly, the product value of the lamp 10 for a vehicle may be enhanced.

Referring to FIGS. 1 to 3, the bezel 300 may include a lower bezel 310 and an upper bezel 330.

The lower bezel 310 may have a first through-hole configured such that the opposite end 400b of the optical fiber 400 passes therethrough, on an opposite side thereof. Furthermore, the upper bezel 330 may be coupled to the opposite side of the lower bezel 310, and may have a second through-hole formed at a location corresponding to the first through-hole.

In detail, the bezel 300 may function to protect and fix the optical fiber 400, and also may function to reflect a portion of the light output from the optical fiber 400.

For convenience of description, a side of the lower bezel 310, which corresponds to the one lengthwise end 400a of the optical fiber 400 will be referred to as one side, and a side of the opposite lengthwise end 400b of the optical fiber 400 will be referred to as an opposite side. Then, the one end 400a and the opposite end 400b of the optical fiber 400 may be fixed to the one side and the opposite side of the lower bezel 310.

The lower bezel 310 may extend along a direction, in which the plurality of optical fibers 400 are arranged, and may include a horizontal part 311 and a vertical part 313. The first through-hole may be formed in the vertical part 313, and the opposite end 400b of the optical fiber 400 may be fixed to the vertical part 313 while passing through the first through-hole.

The upper bezel 330 may be coupled to the vertical part 313 of the lower bezel 310. The second through-hole may be formed in the upper bezel 330 at a location corresponding to the first through-hole. The optical fiber 400 may pass through the first through-hole and the second through-hole in a state, in which the upper bezel 330 and the lower bezel 310 are coupled to each other.

The upper bezel 330 and the lower bezel 310 may be coupled to each other in various schemes. For example, an insertion boss 314 that protrudes in a direction that faces the upper bezel 330 may be formed in the lower bezel 310, and an insertion recess 331 that is recessed such that the insertion boss 314 is inserted thereinto may be formed in the upper bezel 330. After the insertion boss 314 and the insertion recess 331 is assembled while the insertion boss 314 is inserted, the upper bezel 330 and the lower bezel 310 may be coupled to the lamp housing 100.

The lamp according to the embodiment of the present disclosure may further include a fixing part 500. The fixing part 500 may be coupled to the one side of the lower bezel 310, and may be configured such that the one end 400a of the optical fiber 400 is fixed to the one side of the lower bezel 310.

For example, the fixing part 500 may be formed long along a direction, in which the plurality of optical fibers 400 are arranged to fix the ends 400a of the plurality of optical fibers 400 at the same time. The fixing part 500 may be fixed to the one side of the lower bezel 310 through hooking, bolting, or the like, and the one end 400a of the optical fiber 400 may be fixed while being interposed between the fixing part 500 and the lower bezel 310. However, the shape and the kind of the fixing part 500 are not limited to the above description.

Meanwhile, the fixing unit 600 may be fixed to the opposite side of the lower bezel 310, and may be configured such that the opposite end 400b of the optical fiber 400 is fixed to the opposite side of the lower bezel 310. In detail, the bracket 610 may be fixed to the vertical part 313 disposed on the opposite side of the lower bezel 310.

For example, the bracket 610 may be coupled to the lower bezel 310 through bolting, and may be configured to fix the optical fiber 400 that passes through the first through-hole and the second through-hole to the lower bezel 310. In the specification, a direction that faces the upper bezel 330 from the optical fiber 400 with reference to the illustrated drawing is defined as an upward direction, and a direction that faces the lower bezel 310 from the optical fiber 400 is referred to as a downward direction. Meanwhile, the upward direction and the downward direction may be changed according to an installation location of the lamp 10 for a vehicle.

Meanwhile, because the fixing member 650 is coupled to the bracket 610 while being rotated about a center axis of the fixing member 650, the opposite end 400b of the optical fiber 400 fixed to the fixing member 650 is wound on an outer surface of the fixing member 650 whereby a tension is applied to the optical fiber 400.

In detail, after the fixing member 650 is disposed at a location that is adjacent to the bracket 610 in a state, in which the one end 400a of the optical fiber 400 is fixed to the one side of the lower bezel 310 and the opposite end 400b of the optical fiber 400 is fixed to the fixing member 650, it may be rotated about the center axis thereof (see direction "R" of FIG. 4). When the fixing member 650 is rotated, a tension may be generated in the optical fiber 400 while the opposite end 400b of the optical fiber 400 is wound on a circumferential surface of the fixing member 650. Accordingly, the tension may be applied to the optical fiber 400. Then, the tension of the optical fiber 400 may be adjusted according to a rotation degree of the fixing member 650. When the fixing member 650 and the bracket 610 are assembled in a state, in which the tension is applied to the optical fiber 400, the optical fiber 400 may be fixed to the bezel 300 while maintaining the tension. Accordingly, prolongation of the optical fiber 400 due to vibration during an assembly process of the vehicle or driving of the vehicle may be minimized.

The bracket 610 may include a coupling plate 620 and an assembly plate 630. The coupling plate 620 may be coupled to the lower bezel 310. Furthermore, the fixing member 650 may be assembled in the assembly plate 630, and an assembly hole 631, through which the fixing member 650 passes, may be formed in the assembly plate 630.

Furthermore, the coupling plate 620 may be coupled to face the vertical part 313, and the assembly plate 630 may extend perpendicular to the coupling plate 620.

In detail, the bracket 610 may have a form, in which the coupling plate 620 and the assembly plate 630 are bent in an L shape, and the coupling plate 620 and the assembly plate 630 may be perpendicular to each other. The coupling plate 620 may be configured to face the vertical part 313 of the lower bezel 310 to be directly or indirectly coupled to the vertical part 313. As an example, the coupling plate 620 may be bolted to the vertical part 313, but the present disclosure is not limited thereto. When the coupling plate 620 and the vertical plate are coupled to each other, the assembly plate 630 may be disposed perpendicular to the vertical part 313, and the fixing member 650 may be assembled in the assembly plate 630. Accordingly, the fixing member 650, and the opposite end 400b of the optical fiber 400, which is fixed to the fixing member 650, may be fixed to the opposite side of the lower bezel 310.

Meanwhile, the fixing member 650 may include a head 660, a body 670, and a fixed block 680.

The head 660 and the body 670 may be integrally formed with each other, and the body 670 may extend from the head 660, may pass through the assembly plate 630, and may have a fixing hole 671, to which an end of the optical fiber 400 passes to be fixed.

In detail, the head 660 is a part that may be rotated while an operator grips it, and the body 670 is a part that extends from the head 660 and is inserted into the assembly hole 631 of the assembly plate 630. The fixing hole 671 may pass through an area that is adjacent to the head 660 of the body 670, and may pass perpendicular to a lengthwise direction, in which the body 670 extends.

The opposite end 400b of the optical fiber 400 may be inserted into the fixing hole 671. A method for fixing the optical fiber 400 inserted into the fixing hole 671 to the body 670 is not limited, and various methods may be applied. For example, a tip end of the opposite end 400b of the optical fiber 400 may be bent to be fastened to the body 670 in a state, in which the opposite end 400b of the optical fiber 400 is inserted into the fixing hole 671. Furthermore, the opposite end 400b of the optical fiber 400 may be fixed to the fixing member 650 in a heat stacking scheme after being inserted into the fixing hole 671. However, the scheme of fixing the opposite end 400b of the optical fiber 400 to the body 670 is not limited to the above-described one, and various schemes may be applied as long as the opposite end 400b of the optical fiber 400 may be fixed to the body 670 while being inserted into the fixing hole 671.

The fixed block 680 may be provided in the head 660 or the body 670. The fixed block 680 is a part, in which a size (for example, a diameter) thereof in a direction that is perpendicular to a lengthwise direction of the body 670 is larger than a size of the assembly hole 631, and is a configuration for preventing loosening of the fixing member 650. That is, the fixed block 680 may be preliminarily assembled in the assembly plate 630 to restrict rotation of the fixing member 650 when the fixing member 650 is assembled in the bracket 610, and the fixing member 650 and the bracket 610 may be coupled to each other whereby loosening of the fixing member 650 may be prevented. Accordingly, the tension of the optical fiber 400 may be maintained. The fixed block 680 and the assembly plate 630 may be assembled in various schemes. Furthermore, the fixed block 680 may be integrally formed with the head 660 (see FIG. 6) or may be provided in the body 670.

Referring to the first embodiment illustrated in FIGS. 1 to 5, the fixed block 680 may include first saw-teeth 681 formed on a surface that faces the assembly plate 630, along a circumferential direction of the body 670. Furthermore, the assembly plate 630 may have second saw-teeth 633 engaged with the first saw-teeth 681.

In detail, the second saw-teeth 633 may be formed on a surface of the assembly plate 630, which faces the fixed block 680, may be formed along a circumferential direction of the assembly hole 631, and may be formed to be engaged with the first saw-teeth 681. Accordingly, when the fixed block 680 is positioned on the assembly plate 630 after the body 670 passes through the assembly hole 631, rotation of the fixing member 650 with respect to the assembly plate 630 is restricted while the first saw-teeth 681 and the second saw-teeth 633 are engaged with each other. Accordingly, the fixing member 650 and the bracket 610 may be preliminarily assembled.

However, shapes of the first saw-teeth 681 and the second saw-teeth 633 are not limited to the illustrated embodiment, but various modifications may be carried out as long as they may be formed on contact surfaces of the fixed block 680 and the bracket 610 to restrict rotation of the fixing member 650.

Meanwhile, referring to the embodiment illustrated in FIGS. 1 to 5, the fixing member 650 and the bracket 610 may be hook-coupled to each other and the assembly process may be finished. The fixing member 650 may further include a pair of hooks 672 that protrude from an outer surface of the body 670 to be stopped by a lower surface of the assembly plate 630.

In detail, the pair of hooks 672 may be formed on the outer surface of the body 670 to protrude, and may be formed at locations, at which the hooks 672 are adhered to the lower surface of the assembly plate 630. The fixed block 680 may be positioned on the assembly plate 630 while the fixing member 650 passes through the assembly hole 631, and then, the fixing member 650 may be primarily assembled in the assembly plate 630 while the first saw-teeth 681 and the second saw-teeth 633 are engaged with each other. The hook 672 may be stopped by the assembly plate 630 as the fixing member 650 is further inserted in the assembly direction, and accordingly, the assembling process may be finished after the fixing member 650 is secondarily assembled in the assembly plate 630.

Furthermore, the fixing member 650 may further include slits 673. The slits 673 may pass through the body 670 on opposite sides of the pair of hooks 672, and may be formed to extend downwards.

Due to the slits 673, the fixing member 650 and the bracket 610 may be easily hook-coupled to each other. In detail, when the body 670 is inserted into the assembly hole 631, portions of the pair of body 670 having the hooks 672 may be contacted to become closer to each other due to the slits 673. Accordingly, it may become easier to insert the body 670 into the assembly hole 631. Thereafter, when the hooks 672 reach locations of the lower surface of the assembly plate 630, the body 670 returns to an original state and the hooks 672 may be stopped by the assembly plate 630.

Further, due to the slits 673, it may become easier to attach and detach the fixing member 650 and the bracket 610 and thus the tension may be additionally adjusted. In detail, when an additional tension is necessary after the fixing member 650 and the bracket 610 are hook-coupled to each other, portions of the body 670, at which the pair of hooks 672 are formed, may be easily made to become closer to each other due to the slits 673, and thus, it may become easier to insert the body 670 into the assembly plate 630.

Meanwhile, the assembly plate 630 may have a press-fitting groove 632 that is concave along a circumference of the assembly hole 631. Furthermore, the fixing unit 600 may further include an O-ring member 690. The O-ring member 690 may be fitted with an outer surface of the body 670, and may be press-fitted between the body 670 and the press-fitting groove 632 when the fixing member 650 and the assembly plate 630 are coupled to each other.

In detail, the O-ring member 690 is a configuration for firmly fixing the fixing member 650 to the bracket 610, and may have a ring shape to be fitted with the body 670. The O-ring member 690 may be formed of an elastic material such as a rubber material. When the fixing member 650 is inserted into the assembly hole 631, the O-ring member 690 may be inserted into the press-fitting groove 632. Because the O-ring member 690 is press-fitted between the body 670 and the press-fitting groove 632, a gap and a tolerance between the fixing member 650 and the bracket 610 may be compensated for, and accordingly, the fixing member 650 and the bracket 610 may be in a firm coupling state.

Figure 6:
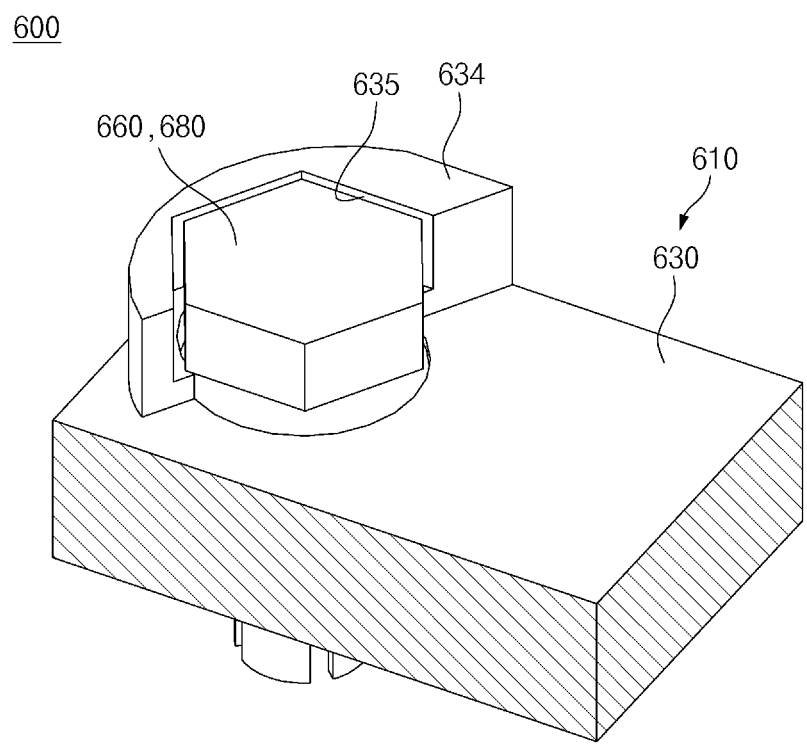
FIG. 6 is a perspective view illustrating a fixing unit according to a second embodiment of the present disclosure.
Figure 7:
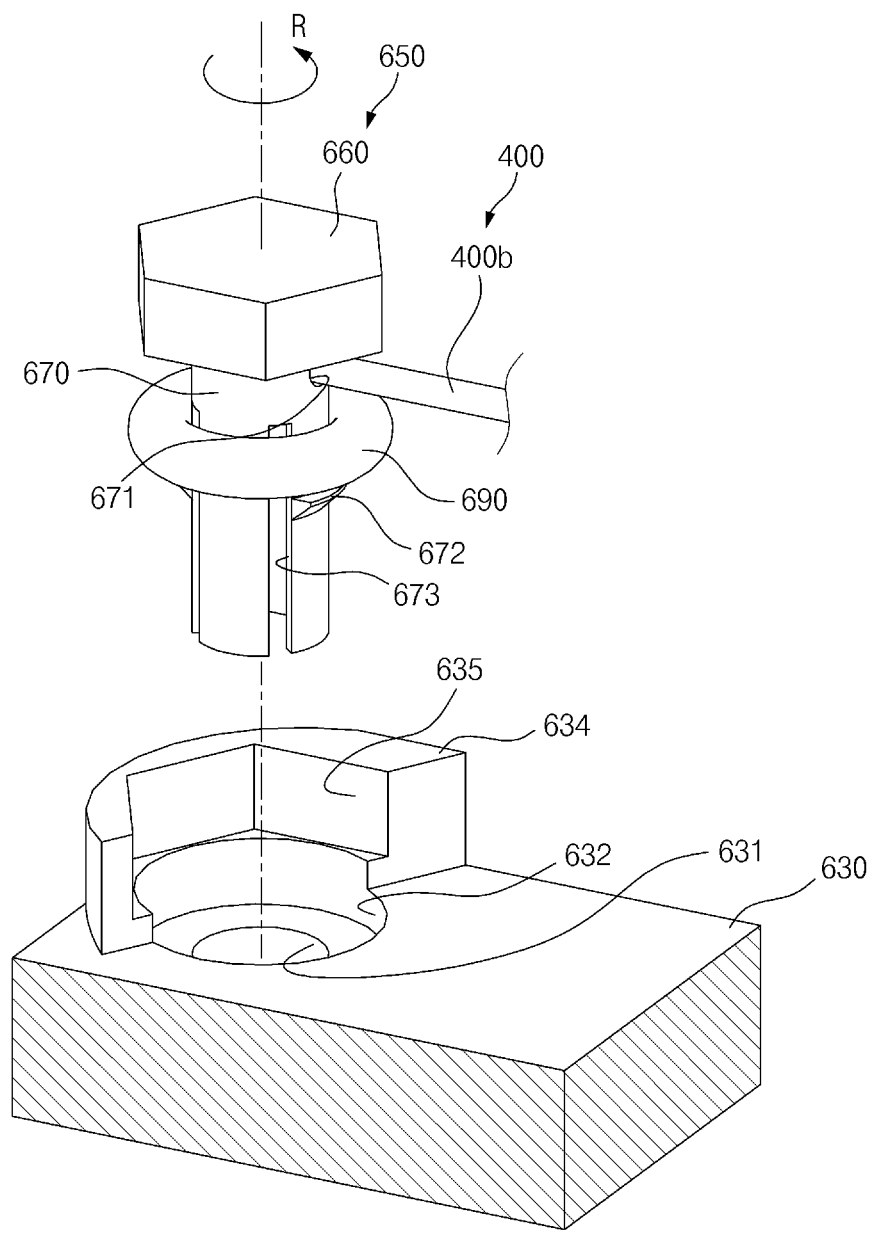
FIG. 7 is an exploded perspective view of a fixing unit according to a second embodiment of the present disclosure.
Figure 8:
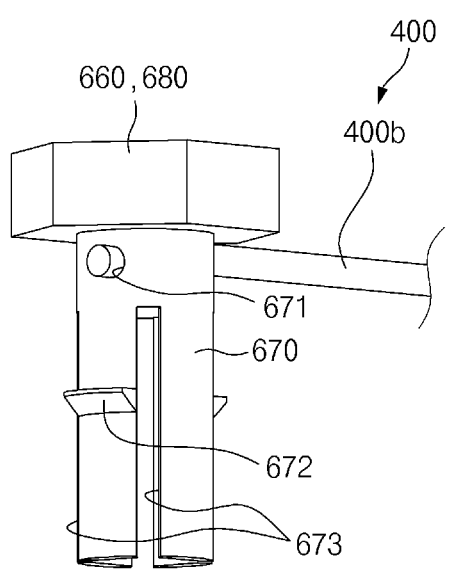
FIG. 8 illustrates a fixing unit according to a second embodiment of the present disclosure, and is a perspective view illustrating a fixing member of FIG. 7.
Figure 9:
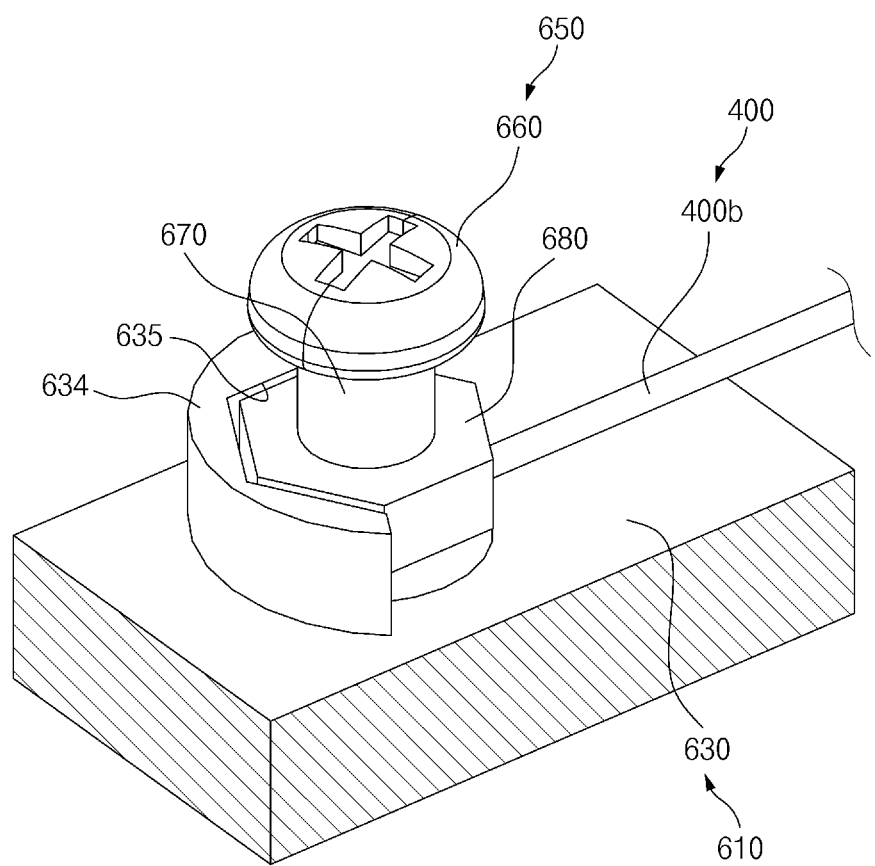
FIG. 9 is a perspective view illustrating a fixing unit according to a third embodiment of the present disclosure.
Figure 10:
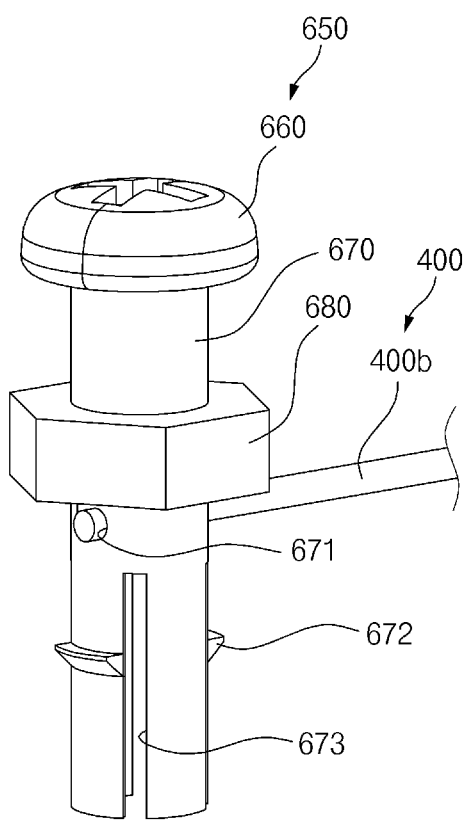
FIG. 10 illustrates a fixing unit according to a third embodiment of the present disclosure, and is a perspective view illustrating a fixing member of FIG. 9.

Meanwhile, FIGS. 6 to 8 illustrate the lamp 10 for a vehicle according to a second embodiment of the present disclosure, and FIGS. 9 and 10 illustrate the lamp 10 for a vehicle according to a third embodiment of the present disclosure. In detail, FIG. 6 is a perspective view illustrating a fixing unit according to the second embodiment of the present disclosure. FIG. 7 is an exploded perspective view of the fixing unit according to the second embodiment of the present disclosure. FIG. 8 illustrates the fixing unit according to the second embodiment of the present disclosure, and is a perspective view illustrating a fixing member of FIG. 7. Furthermore, FIG. 9 is a perspective view illustrating the fixing unit according to the third embodiment of the present disclosure. FIG. 10 illustrates the fixing unit according to the third embodiment of the present disclosure, and is a perspective view illustrating a fixing member of FIG. 9.

The second embodiment and the third embodiment of the present disclosure are different from the first embodiment in the fixed block 680 and the assembly plate 630. Accordingly, the second embodiment and the third embodiment of the present disclosure may include all of the configurations of the first embodiment of the present disclosure, except for the above-described differences. Furthermore, the second embodiment and the third embodiment of the present disclosure are different in a location of the fixed block 680.

Referring to FIGS. 6 to 10, the fixed block 680 according to the second embodiment and the third embodiment of the present disclosure may have a polygonal column shape, of which a cross-section in a direction that is perpendicular to a lengthwise direction of the body 670 is polygonal. Here, the fixed block 680 according to the second embodiment of the present disclosure may be integrally formed with the head 660 (see FIGS. 6 to 8), and the fixed block 680 according to the third embodiment of the present disclosure may be formed in the body 670 separately from the head 660 (see FIGS. 9 and 10). Hereinafter, common configurations of the second embodiment and the third embodiment, except for the location of the fixed block 680, will be described together.

A fixing boss 634 that protrudes in a direction that faces the fixed block 680 and is configured such that at least a portion of a side surface of the fixing boss 634 contacts it may be formed in the assembly plate 630. Furthermore, the fixing boss 634 may have a shape, in which a surface 635 that contacts the fixed block 680 corresponds to a side surface of the fixed block 680, to restrict rotation of the fixed block 680.

In detail, the fixed block 680 may have a polygonal column shape, and the fixing boss 634 may be formed to surround at least one surface of the fixed block 680. Accordingly, when the fixed block 680 and the fixing boss 634 come to contact each other as the fixing member 650 is inserted into the assembly hole 631, rotation of the fixing member 650 may be restricted as the fixed block 680 is stopped by the fixing boss 634. Accordingly, the fixing member 650 and the bracket 610 may be primarily assembled.

However, the shapes of the fixed block 680 and the fixing boss 634 are not limited to the above-described ones, and various modifications may be carried out as long as rotation of the fixed block 680 may be restricted by the fixing boss 634. For example, in addition to a hexagonal column illustrated, the fixed block 680 may have a polygonal column having various shapes, such as a rectangular column or a pentagonal column.

Meanwhile, as in the embodiment illustrated in FIGS. 6 to 10, the assembling process of the fixing member 650 and the bracket 610 according to the second embodiment and the third embodiment may be finished through hook-coupling as in the first embodiment.

In detail, the pair of hooks 672 may be formed on the outer surface of the body 670 to protrude, and may be formed at locations, at which the hooks 672 are stopped by the lower surface of the assembly plate 630. The fixed block 680 may be positioned in the assembly plate 630 as the fixing member 650 passes through the assembly hole 631, and then, a primary assembling process may be performed while rotation thereof is restricted as a side surface of the fixed block 680 contacts the fixing boss 634. The hook 672 may be stopped by the assembly plate 630 as the fixing member 650 is further inserted in the assembly direction, and accordingly, the assembling process may be finished after the fixing member 650 is secondarily assembled.

Figure 11:
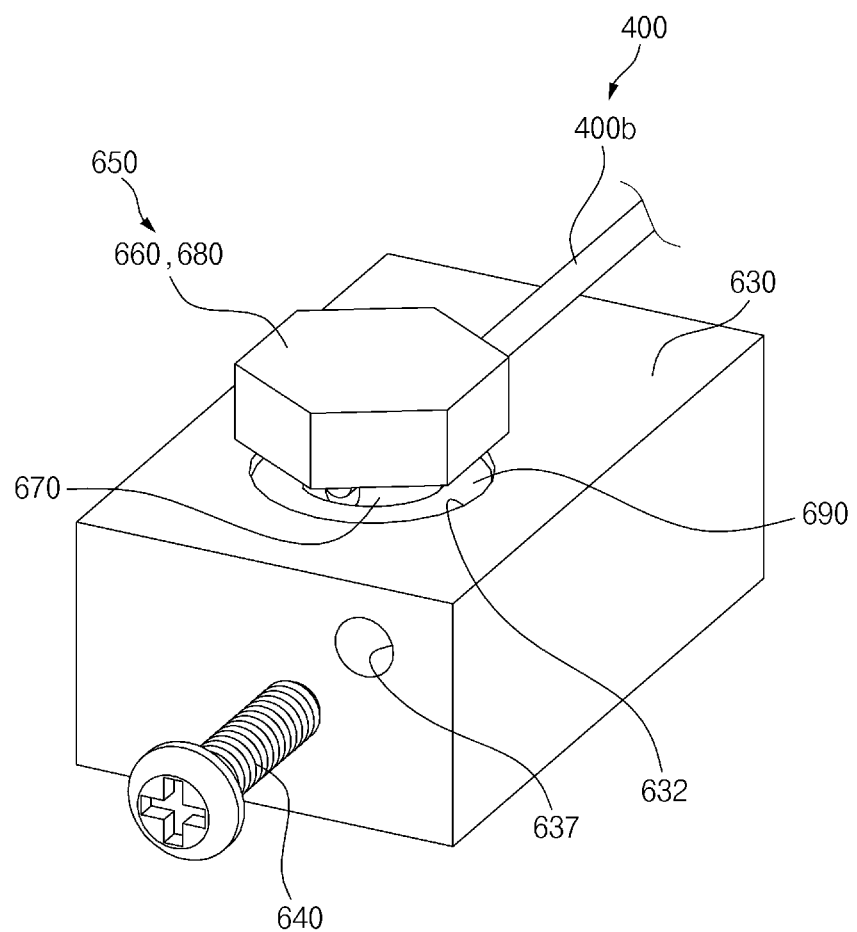
FIG. 11 is a perspective view illustrating a fixing unit according to a fourth embodiment of the present disclosure.
Figure 12:
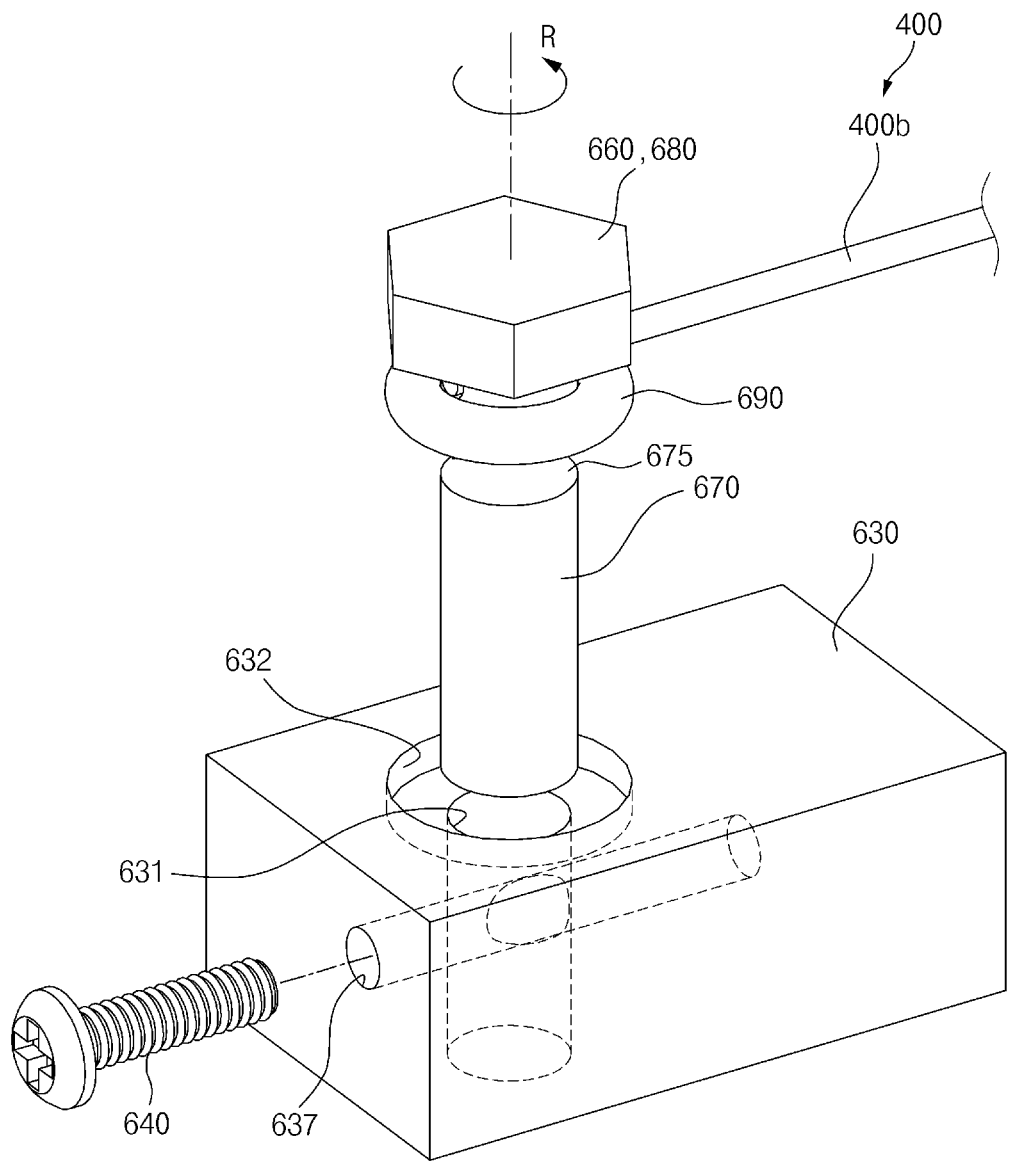
FIG. 12 is an exploded perspective view illustrating a fixing unit according to a fourth embodiment of the present disclosure.
Figure 13:
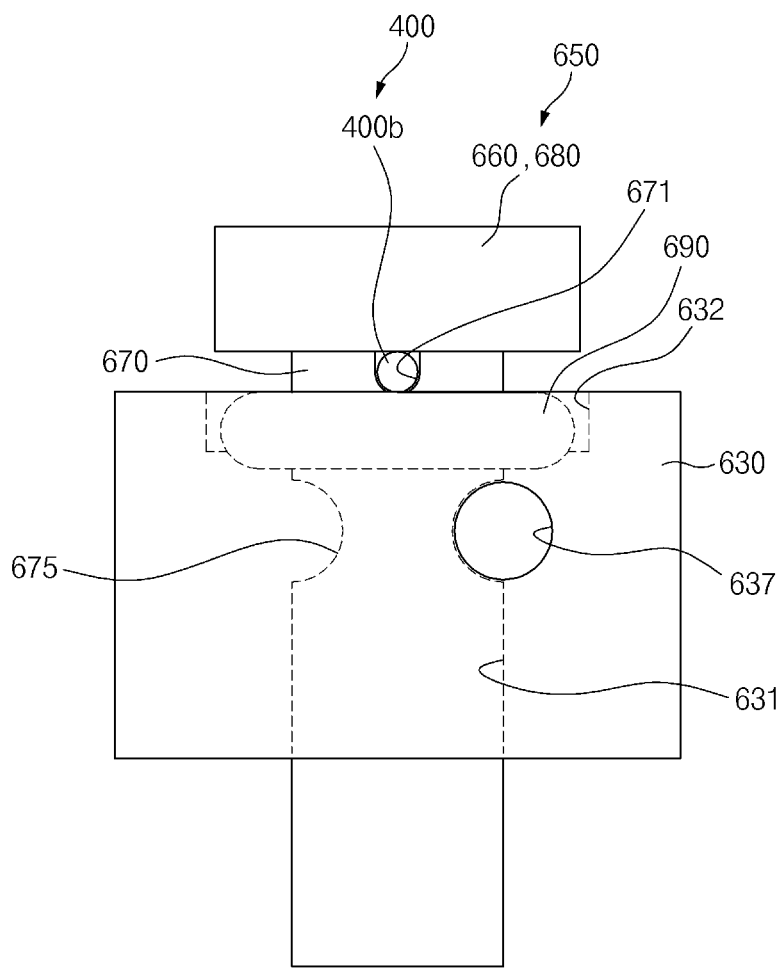
FIG. 13 illustrates a fixing unit according to a fourth embodiment of the present disclosure, and is a view illustrating a locational relationship of a groove and a screw hole.

Meanwhile, FIGS. 11 to 13 illustrate the lamp 10 for a vehicle according to a fourth embodiment of the present disclosure. FIG. 11 is a perspective view illustrating a fixing unit according to the fourth embodiment of the present disclosure. FIG. 12 is an exploded perspective view illustrating the fixing unit according to the fourth embodiment of the present disclosure. FIG. 13 illustrates the fixing unit according to the fourth embodiment of the present disclosure, and is a view illustrating a locational relationship of a groove and a screw hole.

The lamp 10 for a vehicle according to the fourth embodiment of the present disclosure is different from that of the above-described first embodiment in fastening of the fixing member 650 and the bracket 610. In detail, while the fixing member 650 and the bracket 610 are hook-coupled to each other in the first embodiment of the present disclosure, the fourth embodiment of the present disclosure is different in that the fixing member 650 and the bracket 610 are screw-coupled to each other through a fastening screw 640. Accordingly, the fourth embodiment of the present disclosure may include all the configurations of the first embodiment, except for the above-described differences. Hereinafter, a repeated description of the same configurations as the above-described ones will be omitted.

According to the fourth embodiment of the present disclosure, the body 670 may have a groove 675 having a shape that is recessed along a circumference of an outer surface thereof. The assembly plate 630 may include a screw hole 637 that is communicated with the assembly hole 631 and extends in a direction that crosses an extension direction of the assembly hole 631.

For example, an extension direction of the screw hole 637 may be perpendicular to the extension direction of the assembly hole 631.

Furthermore, the fixing unit 600 may further include the fastening screw 640. The fastening screw 640 may be inserted into the groove 675 to fasten the bracket 610 and the fixing member 650 when being fastened to the screw hole 637.

In detail, a cross area, in which an area, in which the screw hole 637 is formed, and an area, in which the assembly hole 631 is formed, are common, may be formed in the assembly plate 630. Through the cross area, the screw hole 637 may be communicated with the assembly hole 631. Furthermore, a location of the cross area may correspond to a location of the groove 675 in a state, in which the fixing member 650 is assembled in the bracket 610.

According to the fourth embodiment of the present disclosure, after the fixing member 650 is inserted into the bracket 610, the fastening screw 640 may be inserted into the groove 675 of the body 670 in the cross area while being inserted into the screw hole 637. For example, the groove 675 may have a semicircular or arc shape on a vertical cross-section. Accordingly, when the fastening screw 640 is inserted into the screw hole 637, the fixing member 650 is pulled in the assembly direction (an insertion direction of the fixing member 650) while the fastening screw 640 is inserted into the groove 675. However, a shape of the groove 675 is not limited to the illustrated embodiment.

Furthermore, when the fastening screw 640 is fastened to the screw hole, the body 670 may be press-fitted with the assembly hole 631, and accordingly, the fixing member 650 may be fixed to the bracket 610.

Thereafter, when the tension of the optical fiber 400 is additionally adjusted, the tension of the optical fiber 400 may be adjusted by forwardly or reversely rotating the fixing member 650 after the fastening screw 640 is separated from the bracket 610. Furthermore, the fixing member 650, the bracket 610, and the fastening screw 640 may be fastened to each other again.

Meanwhile, a vehicle according to the present disclosure may include the lamp 10 for a vehicle.

The lamp 10 for a vehicle may include the lamp housing 100, the light source part 200 housed at or mounted on the lamp housing 100 and configured to irradiate light, the bezel 300 installed in the lamp housing 100, the optical fiber 400, one end of which is fixed to one side of the bezel 300 and an opposite end of which is assembled on an opposite side of the bezel 300, connected to the light source part 200, and configured to output light irradiated from the light source part 200, and the fixing unit 600, in which the opposite end of the optical fiber 400 is assembled on the opposite side of the bezel 300.

Here, the fixing unit 600 may include the bracket 610 fixed to the bezel 300, and the fixing member 650, to which the opposite end of the optical fiber 400 is fixed, and to which the bracket 610 is coupled.

For example, the lamp 10 for a vehicle may be a rear lamp, but the present disclosure is not limited thereto, and may be applied to various lamps such as a headlamp, a turn signal lamp, a tail lamp, a brake lamp, and the like.

Meanwhile, a method for manufacturing a lamp for a vehicle according to an embodiment of the present disclosure will be described below. The method for manufacturing a lamp for a vehicle according to the embodiment of the present disclosure is a method for manufacturing the above-described lamp 10 for a vehicle, and thus a repeated description of the same configurations will be omitted hereinafter.

The method for manufacturing the lamp for a vehicle according to the present disclosure includes a first operation, a second operation, a third operation, and a fourth operation.

The first operation is an operation of preparing the optical fiber 400, the first end 400*b* of which is fixed to the fixing member 650. For example, in the first operation, the first end of the optical fiber 400 may be inserted into the fixing hole 671 formed in the fixing member 650 to be fixed.

The second operation is an operation of fixing the second end 400*a* of the optical fiber 400 to the one side of the bezel 300, and causing the first end of the optical fiber 400 to pass through the opposite side of the bezel 300.

In detail, the second end of the optical fiber 400 may be fixed to the one side of the lower bezel 310 provided in the bezel 300 by the fixing part 500. Furthermore, the first end of the optical fiber 400 may pass through the first through-hole formed on the opposite side of the lower bezel 310 and the second through-hole formed in the upper bezel 330, and the fixing member 650 may be located at a location corresponding to the bracket 610.

The third operation is an operation of applying a tension to the optical fiber 400 by rotating the fixing member 650 such that the optical fiber 400 is wound.

In detail, in the third operation, after the fixing member 650 is located at a location corresponding to the bracket 610, the fixing member 650 may be rotated about the center axis of the fixing member 650. Then, the first end of the optical fiber 400, to which the end of the fixing member 650 is fixed, is wound on the outer surface of the fixing member 650, and thus the tension is applied to the optical fiber 400.

The fourth operation is an operation of fastening the fixing member 650 to the bracket 610 fixed to the bezel 300 while the tension is applied to the optical fiber 400.

For example, the fixing member 650 may be coupled to the assembly plate provided in the bracket 610 through hook-coupling or screw-coupling. By coupling the fixing member 650 and the bracket 610 in a state, in which the tension is applied to the optical fiber 400, prolongation of the optical fiber 400 may be minimized.

Meanwhile, the embodiment of the present disclosure may further include a fifth operation.

The fifth operation is an operation of, after the fixing member 650 and the bracket 610 are separated from each other after the fourth operation, fastening the fixing member 650 and the bracket 610 in a state, in which a tension is additionally applied to the optical fiber 400 by additionally rotating the fixing member 650.

The fixing member 650 and the bracket 610 may be coupled to each other to be separable, through hook-coupling or screw-coupling. Accordingly, even after the optical fiber 400 is fixed to the bezel 300 by the fixing member 650 and the bracket 610, the tension of the optical fiber 400 may be adjusted by forwardly and reversely rotating the fixing member 650 after the fixing member 650 and the bracket 610 are separated from each other when it is necessary to apply the additional tension to the optical fiber 400. Furthermore, the fixing member 650, the bracket 610 are fastened to each other to maintain the adjusted tension of the optical fiber 400.

According to the present disclosure, when the side emitting optical fiber is installed, the optical fiber may be fixed in a state, in which the tension is applied to the optical fiber, by the fixing unit including the fixing member and the bracket, which are assembled with each other.

Accordingly, according to the embodiments of the present disclosure, prolongation of the optical fiber due to assembling or vibration of the vehicle may be minimized even when the side light emitting optical fiber is applied, and accordingly, a product value of the lamp for a vehicle may be enhanced.

Although the specific embodiments of the present disclosure have been described until now, the spirit and scope of the present disclosure are not limited to the specific embodiments, and may be variously corrected and modified by an ordinary person in the art, to which the present disclosure pertains, without changing the essence of the present disclosure claimed in the claims.

What is claimed is:

1. A lamp for a vehicle, comprising:
   a lamp housing;
   a bezel housed within the lamp housing;
   a light source housed within the lamp housing, adjoining a first outer edge portion of the bezel, and configured to irradiate light;
   an optical fiber having (1) a first end portion extending through the first outer edge portion of the bezel and coupled to the light source and (2) a second end portion extending through a second outer edge portion of the bezel located opposite to the first outer edge portion of the bezel,
   a fixing unit coupled to the second outer edge portion of the bezel and configured to hold the second end portion of the optical fiber, wherein the fixing unit includes:
      a bracket coupled to the bezel; and
      a fixing member coupled to the bracket and configured to hold the second end portion of the optical fiber.

2. The lamp of claim 1, wherein:
   the first end portion of the optical fiber is connected to receive the light irradiated from the light source, and
   the optical fiber has a side surface configured to irradiate a portion of the light received from the light source.

3. The lamp of claim 1, wherein the bezel includes:
   a lower bezel having the first and second outer edge portions and a first through-hole positioned at the second outer edge portion of the lower bezel, wherein the second end portion of the optical fiber extends through the second outer edge portion of the lower bezel; and
   an upper bezel coupled to the second outer edge portion of the lower bezel and having a second through-hole positioned corresponding to the first through-hole.

4. The lamp of claim 3, wherein the bracket is coupled to the second outer edge portion of the lower bezel.

5. The lamp of claim 1, the first outer edge portion of the bezel comprises a fixing part configured to hold the first end portion of the optical fiber.

6. A vehicle including the lamp of claim 1.

7. A lamp for a vehicle, comprising:
   a lamp housing;
   a bezel housed at the lamp housing and having first and second side portions spaced apart from and facing each other;
   a light source housed at the lamp housing, adjoining the first side portion of the bezel, and configured to irradiate light;
   an optical fiber having (1) a first end portion extending through the first side portion of the bezel and coupled to the light source and (2) a second end portion extending through the second side portion of the bezel; and
   a fixing unit coupled to the second side portion of the bezel and configured to hold the second end portion of the optical fiber, wherein the fixing unit includes:
      a bracket coupled to the bezel; and
      a fixing member coupled to the bracket and configured to hold the second end portion of the optical fiber,
   wherein the bracket is coupled to the second side portion of the lower bezel,
   wherein the fixing member is coupled to the bracket and configured to hold the second end portion of the optical fiber and be rotatable, and
   wherein the second end portion of the optical fiber held by the fixing member is wound around the fixing member to apply a tension to the optical fiber.

8. The lamp of claim 7, wherein the bracket includes:
   a coupling plate coupled to the lower bezel; and
   an assembly plate having an assembly hole, wherein the fixing member extends through the assembly hole.

9. The lamp of claim 8, wherein:
   the lower bezel includes a horizontal part and a vertical part perpendicular to the horizontal part,
   the coupling plate is positioned to face the vertical part of the lower bezel, and
   the assembly plate is perpendicular to the coupling plate.

10. The lamp of claim 8, wherein the fixing member includes:
    a head;
    a body extending from the head through the assembly hole of the assembly plate and having a fixing hole, wherein the second end portion of the optical fiber extends through the fixing hole; and
    a fixed block coupled to the head or the body of the fixing member.

11. The lamp of claim 10, wherein:
    the fixed block has a surface facing the assembly plate and a first saw-tooth formed on the surface of the fixed block, the surface of the fixed block extending along a circumferential direction of the body of the fixing member, and
    the assembly plate has a second saw-tooth engaged with the first saw-tooth.

12. The lamp of claim 10, wherein:
    the fixed block is of a polygonal column shape,
    the assembly plate has a fixing boss protruding toward the fixed block and in contact with a side surface of the fixed block, and
    the fixing boss has a surface in contact with the fixed block, wherein the surface of the fixing boss has a shape corresponding to that of the side surface of the fixed block.

13. The lamp of claim 10, wherein the fixing member further includes a hook protruding from the body of the fixing member and positioned to be stopped by a lower surface of the assembly plate.

14. The lamp of claim 13, wherein:
    the hook comprises a pair of hooks, and
    the fixing member includes a slit passing through the body of the fixing member on opposite sides of the pair of hooks and extending downwardly.

15. The lamp of claim 10, wherein:
the body of the fixing member has a groove positioned on an outer surface of the body,
the assembly plate includes a screw hole connected to the assembly hole and extending in a direction traversing a longitudinal direction of the assembly hole, and
the fixing unit further includes a coupling screw positioned at the groove and engaged with the screw hole, and configured to couple the bracket and the fixing member.

16. The lamp of claim 15, wherein the screw hole extends perpendicular to the assembly hole.

17. The lamp of claim 10, wherein:
The assembly plate has a press-fitting groove that is concave and extends along a circumference of the assembly hole, and
the fixing unit further includes an O-ring positioned on an outer surface of the body and press-fitted between the body of the fixing member and the press-fitting groove.

18. A method for manufacturing a lamp for a vehicle, comprising:
coupling a first end of an optical fiber to a fixing member;
coupling a second end of the optical fiber to a first side portion of the bezel;
causing the first end of the optical fiber to pass through a second side portion of the bezel;
rotating the fixing member to wind the optical fiber and apply a tension to the optical fiber; and
after rotating the fixing member, coupling the fixing member to a bracket coupled to the bezel.

19. The method of claim 18, further comprising:
after coupling the fixing member to the bracket, separating the fixing member from the bracket;
after separating the fixing member from the bracket, rotating the fixing member to apply an additional tension to the optical fiber; and
after applying the additional tension to the optical fiber, coupling the fixing member to the bracket.

* * * * *